Patented Aug. 25, 1936

2,051,964

UNITED STATES PATENT OFFICE 2,051,964

REFRACTORIES AND METHOD OF MAKING THE SAME

Charles L. Norton, Jr., Boston, Mass., assignor to The Babcock & Wilcox Company, Newark, N. J., a corporation of New Jersey No Drawing. Application February 28, 1935, Serial No. 8,723

25 Claims. (Cl. 25—156)

This invention relates in general to refractory articles made from fired silica-alumina materials which ordinarily have high shrinkage in firing, kaolin being an example of such materials. More particularly the invention relates to the manufacture of refractory bricks for furnaces, furnace linings, flues, hearths, and accessories, blocks for glass tanks, and similar articles which in use are subjected to high temperatures for long periods of time. Great difficulty has heretofore been experienced in the manufacture of such articles because it has been considered necessary to fire them at the temperature at least to which they are subsequently subjected in use, and when subjected to these temperatures during manufacture they shrink, distort and soften to such an extent that they "squat" under slightly more than their own weight. The object of the present invention is, therefore, to provide such articles which may be made more easily and cheaply and which in use will be more satisfactory. The invention includes both the novel article of manufacture and the method of making it.

The invention will be most easily understood by consideration of a refractory brick embodying my invention and made according to my novel process. Such refractory bricks must maintain their strength at or above 3000° F., must maintain a substantially constant volume, and keep their shape under the normal conditions of use. During manufacture they must also remain hard enough so that they will not squat in the kiln. Heretofore in the manufacture of such kaolin bricks it has been necessary to fire them at from 2900° F. to 3050° F., but they soften so much at or below these temperatures that it is inadvisable to pile them more than two high in the kiln, and therefore it is almost necessary to use a tunnel kiln. It has also been usual to employ preburned kaolin grog in their manufacture to reduce the tendency to shrinkage. In this case the grog is made from fine kaolin clay fired at about 3100° F. and crushed. This grog is then mixed with unburned kaolin clay, the bricks formed, and the whole fired again, this time at from 2900° to 3050° F. The many difficulties which have attended the manufacture of such bricks have been chiefly due to the high shrinkage of the material and the extremely high temperatures required for firing. The shrinkage of the material is progressive and therefore the bricks must be burned at temperatures high enough and held long enough to give the qualities necessary to maintain their form and volume under service conditions. The tendency to soften or squat reduces the kiln capacity, and increases the expense. The extremely high temperature injures the kiln and the conveyor or cars so that constant repairs are required. It also requires the use of extravagant amounts of fuel which are disproportionate to the amount of goods produced.

My present invention makes it possible to produce, from silica-alumina materials which have high shrinkage and high firing temperature requirements, satisfactory refractory bricks, and like articles, at a temperature of about 2250° F. Such bricks have the necessary strength and stiffness during firing. They do not shrink objectionably when heated above that point, and do not have their failure temperature lowered substantially. They can be piled to considerable height in the kiln. In use they tend to improve in quality and hardness rather than to deteriorate.

The present invention is based on the important physical discovery that certain addition substances (either glasses or glass forming materials) having melting points much lower than the base materials of which the brick is made will, when heated to the fusion point of the addition substance, combine with an element or elements of the base material and progressively form a succession of glasses each of which has a higher melting point than the preceding, the process continuing progressively until substantially all the addition substance has combined. It has further been discovered that these addition substances promote the formation of mullite crystals at relatively low temperatures, and increase the quantity which is formed, these crystals being embedded in glasses having successively higher melting points. This action results in a great strengthening and stiffening of the bricks during firing because at the relatively low temperature at which the addition substance fuses no other part of the material composing the brick fuses, and since the addition substance combines with the other materials to form a higher melting point glass which itself takes up more silica, the mass is never suffused with molten or fluid matrix as the temperature rises and there is no tendency of the internal structure to slip on itself and slump. The formation of mullite crystals which give strength to the structure of the mass is promoted rather than hindered by the presence of the glasses of progressively higher melting points, and the crystals extend past the grain boundaries of the kaolin particles. It may also be added that it is essential to employ an addition substance which itself has a very low melting point, since the desired reaction is greatly accentuated as soon as the addition substance melts, and, as stated above, the subsequent reaction products are of progressively higher melting points, whereas if an addition substance such as lime is used, it does not become an active reagent until it is considerably above the melting point of the addition agent of my invention, and further as soon as it becomes active it forms compounds of much lower melting points than the point at which the reaction begins, and the mass is, while at the high temperature needed to start the reaction, suffused with low melting point compounds in a fluid condition. Such high temperature reacting additions, sometimes called fluxes, result in a mixture having a very narrow maturing range, making it difficult to burn because of the very careful, accurate temperature control required.

The importance of my discoveries will be further appreciated from the fact that the strength and constancy of volume of the final product are in close relation to the amount of mullite formed. In the manufacture of refractory materials in accordance with my invention the change in internal structure begins at a relatively low temperature and progresses rapidly as the temperature rises. The result is that at about 2250° F. an equilibrium condition of silica and alumina is reached and this is substantially that reached at 2900° F. where raw materials without the addition substance are employed. Thereafter if submitted to a higher temperature than 2250° F., the brick shrinks but slightly. In this respect the bricks embodying my invention are distinctly different from bricks as heretofore manufactured.

This peculiar characteristic of the brick embodying my invention is very important because the bricks which have been fired at about 2250° F. may be placed in furnace linings, glass tank linings, and similar situations, and when subsequently subjected to higher temperatures do not shrink enough to upset the setting, the chief result of the further heating being a consolidation and change in the size of the mullite crystals and a consequent improvement in the quality of the brick. The initial softening or incipient fusion of the addition substance, but without complete fusion or liquefaction of the whole mass, and with subsequent stiffening due to the combination of the addition substance with the base material, promotes the development of the internal structure to an equilibrium condition without producing any objectionable tendency on the part of the brick or other article to squat or be deformed under load during such development, while the growth of the crystalline structure and progressive formation of higher melting point glasses at relatively low temperatures further strengthens and stiffens the article, so that when it is subsequently subjected to service conditions there is little tendency to shrinkage or deformation.

It will be understood that the foregoing statements are based on my present knowledge of the action and behavior of the materials, and are for the purpose of giving the fullest possible information in regard to the invention now available to me, but I do not limit myself to this particular theory of operation.

Heretofore, it has been assumed that it was necessary to heat such articles during firing to the temperature at least under which they are to be used, but the discoveries described herein make it possible to produce satisfactory articles at temperatures of a materially lower order than the fusion point of the base material, that is to say, temperatures which are several hundred degrees lower than those to which the bricks are to be subjected in use. Subsequent higher temperatures are not only not destructive, but on the contrary tend to consolidate the mullite crystalline structure and consequently further strengthen the bricks.

Suitable addition substances are low-melting point glasses, i. e., those which melt well below 1800° F., preferably about 1500° F., or materials which will combine at low temperatures with silica, and further are subsequently capable of combining progressively with ingredients of the base materials to form other compounds having progressively higher melting points than that of the original addition substance and promote the formation of mullite. As an addition substance for use in the manufacture of kaolin brick, I prefer to use a boro-silicate glass typified by the following formula:

| | Parts by weight |
|---|---|
| Lime | 144 |
| Feldspar | 55 |
| Sodium carbonate | 49 |
| Borax | 925 |
| Silica | 18 |

The glass formed by the fusion of these materials, in the proportions mentioned has a melting point of about 1500° F. and is the best addition substance which I have so far discovered for kaolin grog brick, having regard to expense.

Another suitable glass is the ordinary soda-lime glass typified by the following formula:

| | Parts by weight |
|---|---|
| Silica ($SiO_2$) | 70 |
| Soda ($Na_2O$) | 15 |
| Lime (CaO) | 15 |

Lead glass is also suitable, for example, a glass having the formula: silica 16 parts and PbO 84 parts, by weight.

Certain substances which form low melting point glasses may also be employed. For instance borax and cryolite or sodium-aluminum fluoride. The above list is not exclusive and there are other materials which may be employed in practicing my invention. It is probably preferable to employ substances which are fused together before using and are, therefore, combined with each other before combining with the base materials of the article, but certain glass forming materials, for instance borax and cryolite, may be used without pre-fusion.

In making refractory brick embodying my invention, and of the type in which a kaolin grog and a boro-silicate glass are employed, I first mix the materials for the glass and melt them. This glass has a melting point of about 1500° F. The glass is then comminuted, conveniently by being poured into water, and then ground. The powdered glass is then mixed in the proportion of 4 per cent of glass to 96 per cent of raw kaolin to form a bond mixture. This is mixed with kaolin grog which is raw kaolin which has been heated to the point of incipient fusion at about 3100° F., allowed to cool and then crushed to about four mesh or finer. For one type of refractory brick I employ 70 per cent of this grog and 30 per cent of the combined raw kaolin clay and glass. Bricks formed from these materials are fired at a temperature of about 2250° F., and are held there for about an hour or more. Probably some variation in temperature below 2250° F. is permissible, depending upon the length of time employed. Higher temperature than 2250° F. may also be employed.

The brick can be piled higher in the kiln than an ordinary kaolin grog brick, and kilns which have considerable variation in temperature between top and bottom can be employed without producing serious variations in the quality of the bricks produced. While it is probably desirable to make these bricks in tunnel kilns, because of the greater uniformity of conditions, it is also possible to make them in beehive or periodic kilns in which the bricks are piled one upon the other to a considerable height.

I have observed that bricks made in accordance with my improved process have a different fracture from ordinary kaolin grog bricks. The latter break with a uniform vitreous fracture through grog and bond, while in bricks made in accordance with the present invention, but not subsequently subjected to higher temperatures, the fracture tends to follow the spaces or surfaces between the original particles of the grog of which it is chiefly composed. In other words, bricks made as above described retain, to a certain but perceptible extent, their original aggregate-bond structure. When, however, they are subjected to the higher temperature of service, they mature to a structure substantially identical with similar bricks as heretofore fired, and consisting essentially and substantially wholly of mullite crystals embedded in a glass matrix, but without any substantial amount of subsequent shrinkage, distortion or softening.

If desired, the invention may also be embodied in an article made from raw kaolin employing grog in smaller proportions or none at all, but in these cases there will be more shrinkage during firing. On the other hand, when grog is employed, the invention may, if desired, also be utilized in the preparation of the grog itself; that is to say, instead of preparing the grog by heating the raw material to a relatively high temperature of the order of 3100° F., the raw material may have mixed therewith a suitable proportion of the addition substance and the mixture fired at a relatively lower temperature of the order of 2250° F., and the preparation of grog in this manner is to be understood as constituting one mode of practicing the invention.

If desired, porous bricks may also be made, the pores being formed by well known methods, as by aeration or the addition of a suitable proportion of a fusible, volatile or combustible material, such as wood flour or sawdust, mixed into the mass from which the brick is formed.

In order further to increase the hardness of the bricks and reduce any tendency to shrinkage under high temperature service conditions, there may, if desired, be incorporated therein suitable quantities of phosphate rock and cyanite, the former increasing the hardness of the glass matrix at high temperature, and the latter, due to its expansion under high temperatures, acting to offset or compensate for any concurrent tendency to shrinkage on the part of the other ingredients. Suitable proportions, by weight of the entire mix, are as follows:

| | Per cent |
|---|---|
| Phosphate rock | 2 to 4 |
| Cyanite | 5 to 10 |

I am aware that it has been suggested to add fluxes or fluxing materials to the body of ceramic ware for the purpose of lowering firing temperatures and to increase the vitreous characteristics of the ware, but such fluxes, so far as I am aware, have had relatively high melting points approximating the melting point of the base materials employed, and when heated to fusion combine with the elements of the base material to form substances having lower melting points; consequently, they have produced large quantities of fluid glass in the mass and this diminishes the rigidity of the structure, causes distortion during firing and lowers the failure temperature. Accordingly, I believe that I am the first to discover that amounts of low melting point glass or glass forming material, such that it will combine with the other materials as the temperature rises during firing to form higher instead of lower melting point glasses, promotes the production of mullite at temperatures lower than that at which the mass begins to shrink, and therefore that by selecting a proper low melting point addition substance the entire structure can be strengthened and the firing can be done at a relatively low temperature, producing a refractory product which is satisfactory even though it is subsequently exposed to much higher temperature. Under these conditions no fluid glass matrix is formed in sufficient quantities at least to cause the internal structure of the mass to slump.

The greatly reduced temperature at which my improved article may be produced not only saves fuel but also produces a large saving in the expense of maintaining the kilns and prolongs their life.

I claim:

1. The method of inducing the formation of mullite crystals in a fired silica-alumina article at low temperatures which consists in mixing with the base material a low melting point substance capable of combining with the elements of the base material to form a succession of glasses having successively higher melting points, and heating the whole until the formation of mullite crystals and glass has progressed sufficiently to give the article requisite strength.

2. The method of inducing the formation of mullite crystals in a fired silica-alumina article at low temperatures which consists in mixing with the base material a low melting point substance capable of combining with the elements of the base material to form a succession of glasses having successively higher melting point, and heating the whole to a temperature of between 1500° F. and 2250° F. until the formation of mullite crystals and glass has progressed sufficiently to give the article requisite strength.

3. The method of inducing the formation of mullite crystals in a fired silica-alumina article at low temperatures which consists in mixing with the base material a boro-silicate glass of substantially the following formula:

| | Parts by weight |
|---|---|
| Lime | 144 |
| Feldspar | 55 |
| Sodium carbonate | 49 |
| Borax | 925 |
| Silica | 18 | and heating the whole until the formation of mullite crystals and glass has progressed sufficiently to give the article requisite strength.

4. The method of inducing the formation of mullite crystals in a fired silica-alumina article at low temperatures which consists in mixing with the base material a soda-lime glass of substantially the following formula:

| | Parts by weight |
|---|---|
| Silica | 70 |
| Soda | 15 |
| Lime | 15 | and heating the whole until the formation of mullite crystals and glass has progressed sufficiently to give the article requisite strength.

5. The method of inducing the formation of mullite crystals in a fired silica-alumina article at low temperatures which consists in mixing with the base material a lead glass of substantially the following formula:

| | Parts by weight |
|---|---|
| Silica | 16 |
| PbO | 84 | and heating the whole until the formation of mullite crystals and glass has progressed sufficiently to give the article requisite strength.

6. The method of making a fired silica-alumina article which includes mixing with the base material a low melting point glass or glass forming substance which fuses at about 1500° F., and is capable of combining with elements of the base material to form a succession of glasses having successively higher melting points, and heating the whole until an internal structure of mullite crystals and glass has formed sufficiently to give the article the requisite strength.

7. The method of making a fired refractory article which includes adding to a silica-alumina base material a substance having an initial fusing point of a materially lower order than that of the base material and capable upon fusion of combining with portions of the base material to form a glass of higher fusing point than that of the original added substance, and heating the mixture to a temperature higher than the initial fusing point of the added substance but materially lower than the fusing point of the base material.

8. The method of making a fired refractory article which includes adding to a silica-alumina base material a substance having an initial fusing point of approximately 1500° F. and capable upon fusion of combining with portions of the base material to form a glass of higher fusing point than that of the original added substance, and heating the mixture to a temperature between 1500° F. and 2250° F.

9. The method of making a fired refractory article which includes adding to a silica-alumina base material a substance having an initial fusing point of a materially lower order than that of the base material and capable upon fusion of progressively combining with portions of the base material to form glasses of successively higher fusing points, and raising the temperature of the mixture from a point below the initial fusing point of the added substance to a point higher than said initial fusing point but materially lower than the fusing point of the base material.

10. The method of making a fired refractory article which includes adding to a silica-alumina base material a boro-silicate glass having substantially the following formula:

| | Parts by weight |
|---|---|
| Lime | 144 |
| Feldspar | 55 |
| Sodium carbonate | 49 |
| Borax | 925 |
| Silica | 18 | and heating the mixture to a temperature higher than the melting point of the glass but materially lower than the fusing point of the base material.

11. The method of making a fired refractory article which includes adding to a silica-alumina base material a soda-lime glass having substantially the following formula:

| | Parts by weight |
|---|---|
| Silica | 70 |
| Soda | 15 |
| Lime | 15 | and heating the mixture to a temperature higher than the melting point of the glass but materially lower than the fusing point of the base material.

12. The method of making a fired refractory article which includes adding to a silica-alumina base material a lead glass having substantially the following formula:

| | Parts by weight |
|---|---|
| Silica | 16 |
| PbO | 84 | and heating the mixture to a temperature higher than the melting point of the glass but materially lower than the fusing point of the base material.

13. The method of making a refractory article by mixing burned kaolin grog with a bonding material composed of raw kaolin and a pre-fused material whose melting point is raised by absorption of an element from the kaolin, forming the article from the said mixture, and firing the article to a temperature of about 2250° F.

14. The method of forming a refractory article from a silica-alumina base material which includes adding to the raw material a substance which will on heating to 2250° F. produce an equilibrium condition of silica and alumina substantially that which would be produced by firing the raw material alone to 2900° F. and heating the whole to 2250° F.

15. The method of forming a refractory article from a silica-alumina base material which includes adding to the raw material a substance which will on heating to 2250° F. produce an equilibrium condition of silica and alumina substantially that which would be produced by firing the raw material alone to 2900° F., but with materially less volume shrinkage, and heating the whole to 2250° F.

16. The method of forming a refractory article from kaolin and producing therein an equilibrium condition of silica and alumina with materially less volume shrinkage and at a temperature below 2900° F., which includes adding to the raw kaolin a glass or glass forming substance and heating the whole to substantially 2250° F.

17. The method of inducing the formation of mullite crystals in a fired silica-alumina article at low temperatures and increasing the hardness of said article at high temperatures which includes mixing with the base material phosphate rock and a low melting point substance capable of combining with elements of the other ingredients to form a succession of glasses having successively higher melting points, and heating the whole until the formation of mullite crystals and glass has progressed sufficiently to give the article requisite strength.

18. The method of making a fired kaolin article which includes mixing with the kaolin phosphate rock, cyanite, and a pre-fused glass having a melting point of less than 1800° F., and heating the mixture to approximately 2250° F.

19. A refractory article comprising a fired mixture of a silica-alumina base material and a substance having an initial fusing point of a materially lower order than that of the base material and capable upon fusion of combining with portions of the base material to form a glass of higher fusing point than the initial fusing point of said substance.

20. A refractory article comprising a fired mixture of a silica-alumina base material and a substance having an initial fusing point of a materially lower order than that of the base material and capable upon fusion of progressively combining with portions of the base material to form a succession of glasses of successively higher fusing points.

21. A refractory article comprising a fired mixture of a silica-alumina base material, phosphate rock, and a substance having an initial fusing point of a materially lower order than that of the base material and capable upon fusion of combining with portions of the base material to form a glass of higher fusing point than the initial fusing point of said substance.

22. A refractory article comprising a fired mixture of kaolin, a pre-fused low melting point glass, phosphate rock, and cyanite.

23. A fired refractory article composed of pre-fired silica-alumina grog particles and a bond of substantially the same but raw material, said article consisting substantially wholly of mullite crystals and a glass matrix, and having a characteristic fracture following surfaces between the original grog particles.

24. A fired refractory article composed of an aggregate of silica-alumina grog particles and a bond of the raw material of which the grog is made, said article consisting chiefly of mullite crystals and a glass matrix but perceptibly retaining its original aggregate-bond structure.

25. A fired refractory article composed of an aggregate of kaolin grog particles and a bond of raw kaolin and a glass forming material, said article consisting chiefly of mullite crystals and a glass matrix but perceptibly retaining its original aggregate-bond structure.

CHARLES L. NORTON, Jr.